United States Patent [19]

Matsuura

[11] Patent Number: 5,604,345
[45] Date of Patent: Feb. 18, 1997

[54] OPTICAL ENCODER HAVING A COMBINATION OF A UNIFORM GRATING AND A NON-UNIFORM GRATING

[75] Inventor: Tatsuhiko Matsuura, Kanagawa, Japan

[73] Assignee: Mitutoyo Corporation, Tokyo, Japan

[21] Appl. No.: 559,113

[22] Filed: Nov. 16, 1995

[30] Foreign Application Priority Data

Nov. 25, 1994 [JP] Japan .................................. 6-315563

[51] Int. Cl.$^6$ .................................................. G01B 11/14
[52] U.S. Cl. .............................. 250/237 G; 250/231.16; 356/374
[58] Field of Search ......................... 250/237 G, 231.16; 356/374, 375, 356; 33/707

[56] References Cited

U.S. PATENT DOCUMENTS

4,782,229  11/1988  Ernst .
5,068,530  11/1991  Ieki et al. .
5,182,613   1/1993  Ieki et al. ............................. 250/237 G

*Primary Examiner*—Edward P. Westin
*Assistant Examiner*—Kevin Pyo
*Attorney, Agent, or Firm*—Oliff & Berridge

[57] ABSTRACT

A main scale 11 and an index scale 12 are arranged in parallel with each other so as to be relatively movable. A light source 10 for irradiating collimated light on the main scale 11 is provided above the main scale 11. A light detecting devices 13a and 13b for detecting the amount of light which pass trough the index scale 12 are provided below the index scale 12. The main scale 11 has an uniform grating which consist of transmitting portions 14 and non-transmitting portions 15 which are formed with a uniform width and alternately arranged by uniform pitch P. The index scale 12 has non-uniform grating portions 12a and 12b whose phase are mutually shifted 90 degrees. Transmitting portions 16 and non-transmitting portions 17 of the non-uniform grating portions are arranged at the same pitch as the main scale 11. Each width of the non-transmitting portions 17 is equal to each width of sliced portions of a sine waveform sliced by 10 slice levels, the sine waveform is represented bottom-to-bottom and whose wavelength is equal to one pitch of the uniform grating. The non-uniform gratings 12a and 12b substantially work as the sine wave gratings, so that an output signal excluding the harmonic components distortion can be obtained.

9 Claims, 7 Drawing Sheets

MAIN SCALE
51

INDEX SCALE
52

OPTICAL ENCODER HAVING A COMBINATION OF A UNIFORM GRATING AND A NON-UNIFORM GRATING

BACKGROUND OF THE INVENTION

1. Field of the Invention

The present invention relates to an optical encoder having a combination of a uniform grating and a nonuniform grating.

2. Description of the Prior Art

A conventional optical encoder includes a main scale and an index scale which are arranged in parallel with each other so as to be relatively movable, a light source for irradiating collimated light on the scales and a photo detector for detecting an shading pattern modulated by the overlap state between the main scale and the index scale. Each of the main scale and the index scale has an optical grating. Generally, the optical gratings of the scales are composed of transmitting portions and non-transmitting portions which are alternately arranged with a predetermined width of 1:1 at a predetermined pitch. Assuming that there is no diffraction, when the collimated light is irradiated to each of the scales, the light amount distribution transmitted through the grating of each of the scales shows a rectangular wave pattern. Hereinafter, such a grating is referred to as a "rectangular wave grating".

When the main scale and the index scale are relatively displaced, the output light quantity obtained in accordance with the overlap condition of such rectangular wave gratings ideally becomes a triangular wave signal. In fact, however, it becomes a pseudo-sine curve because of diffraction and so on. A relative position is detected by using the sine wave output signal as a displacement signal. Generally, a pair of index scales is used to obtain so-called A phase and B phase sine wave signals which are mutually phase shifted of 90 degrees.

The above mentioned displacement signal formed of a pseudo-sine wave is different from an ideal sine wave signal. Namely, a waveform distortion is large. Especially, the distortion rate depends on a fluctuation of the gap between the main scale and the index scale. The fluctuation of the distortion rate is mainly caused by odd ( third, fifth, . . . ) harmonic components included in the displacement signal. If position measurement is performed by use of the displacement signal including the distortion rate fluctuation, measurement errors get large.

Several technologies to reduce the measurement errors accompanied with the waveform distortion in the displacement signals have been suggested. For example, it is known that two rectangular grating patterns are provided on a scale, the grating patterns being phase shifted a little each other, to cancel the harmonic components in the displacement signal by adding two output signals(refer to U.S. Pat. No. 5,068, 530 ).

Another prior art suggests that a combination of gratings, one of which is formed of rectangular patterns and the other is formed of sine wave patterns, can prevent output signal from including the harmonic components refer to U.S. Pat. No. 4,782,229 ). Hereinafter, a grating having sine wave patterns, which can fundamentally obtain only sine wave outputs by combination with a rectangular wave grating, is referred to as a "sine wave grating".

By the above mentioned conventional technologies, it is possible to reduce the wave distortion factor roughly. However, it is not yet possible to obtain a precision highly enough to apply for a position measuring in a precise machine manufacture and so on. Further, it is difficult to make a sine wave grating pattern in view of a current manufacturing technology.

SUMMARY OF THE INVENTION

In view of the aforementioned problem, an object of the present invention is to provide an optical encoder which effectively removes the harmonic distortion in the displacement signal by controlling the scale grating widths to be able to perform precise measurement.

According to the present invention, for achieving the object described above, there is provided an optical encoder having first and second scales arranged in parallel with each other to be relatively movable, optical gratings being formed thereon at a predetermined pitch respectively, a light source for irradiating collimated light to the first scale, and light detecting means for detecting transmitted lights through the second scale, the shading pattern of the transmitted lights being modulated by the overlapping state between the first and second scales, wherein one of the first and second scales has a uniform grating which is formed of a plurality of rectangular transmitting portions and a plurality of rectangular non-transmitting portions alternately arranged at a predetermined pitch, each of the rectangular transmitting portions having a uniform width, and the other of the first and second scales has a non-uniform grating consisting of at least one set of M (where M is an integer of 2 or more ) pairs of rectangular transmitting portion and rectangular non-transmitting portion, the pairs being arranged at the same pitch as the uniform grating, the rectangular transmitting portions on the non-uniform grating having different widths from each other within the one set of M pairs so as to distributively include information of one cycle sine waveform whose wavelength is equal to one pitch of the uniform grating. Where, the one cycle sine waveform is represented in a range of bottom-to-bottom, and each width of the rectangular transmitting portions on the non-uniform grating is set to be equal to each width of sliced portions of the one cycle sine waveform sliced by M different slice levels.

According to this invention, one of the scales is an uniform grating as same as a conventional usual rectangular wave grating, and the other is a non-uniform grating, the transmitting portions and the non-transmitting portions of the non-uniform grating being arranged at the same pitch of the uniform grating, and each width of the transmitting portions and the non-transmitting portions having the same as each width at M sliced levels of the sine waveform which has a wavelength equal to one pitch of the uniform grating. In other words, the non-uniform grating has amplitude information of the sine waveform in its grating widths, and it substantially works in the same way as a sine wave grating. Therefore, it is able to output the displacement signal excluding the harmonic components of the sine wave by cooperation with such a uniform grating scale and a non-uniform grating scale. As a result, the precise position measurement can be done by processing this displacement signal. One of the uniform grating scale and the non-uniform grating scale can be selected as a main scale, the other can be selected as an index scale.

Moreover, according to the present invention, it is not necessary to form of a sine wave pattern for manufacturing of scales, thereby it is able to easily make scales having precise grating patterns. As a result, the position measurement precision of the optical encoder can be improved.

Furthermore, according to one preferred mode, it is provided an optical encoder that the non-transmitting portions, which have different widths from each other, are dispersed so as to minimize the variation of the widths of the transmitting portions in the set. According to the above-mentioned mode, the spatial distribution of the output light quantity can be more uniform. According to another preferred mode, it is provided an optical encoder that the transmitting portions are dispersed so as to minimize the variations of the widths of the non-transmitting portions. This aspect of the invention is advantageous to secure wiring areas of a photo detector array in case that the photo detector array is formed to serve as an index scale. Also, by such a dispersed layout, an high processing precision can be obtained when a minute scale pitch is required. This can also improves a position measurement precision.

DETAILED DESCRIPTION OF THE PREFERRED EMBODIMENTS

Figure 1:
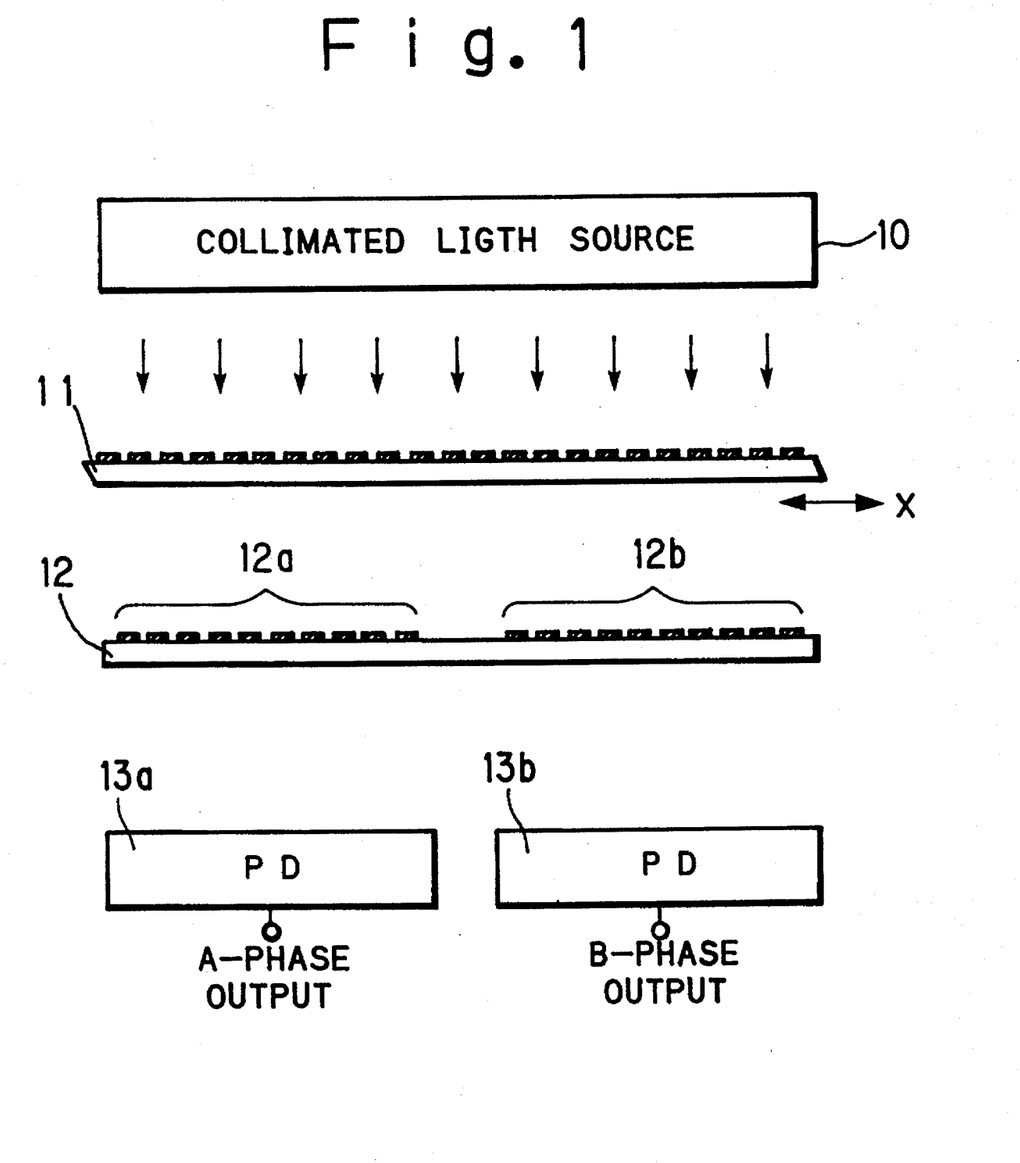
FIG. 1 shows a transmitting type linear encoder of an embodiment according to the present invention.

FIG. 1 shows a configuration of a transmitting type linear encoder according to one embodiment of a present invention. A main scale 11 and an index scale 12 are arranged in parallel with each other, and, for example, the main scale 11 is able to displace regarding with x direction indicated by an arrow in FIG. 1. The index scale 12 has two grating portions 12a, 12b whose phase are mutually shifted 90 degrees in relation to the main scale 11. A light source 10 for irradiating collimated light on the main scale 11 is provided above the main scale 11, and light detecting devices 13a and 13b are provided bellow the index scale 12. The detecting devices 13a and 13b oppose the grating portions 12a and 12b, and detect the amount of light which pass through the grating portions 12a and 12b, respectively. The light detecting devices 13a and 13b are, for example, photo diodes or photo-transistors.

Figure 2:
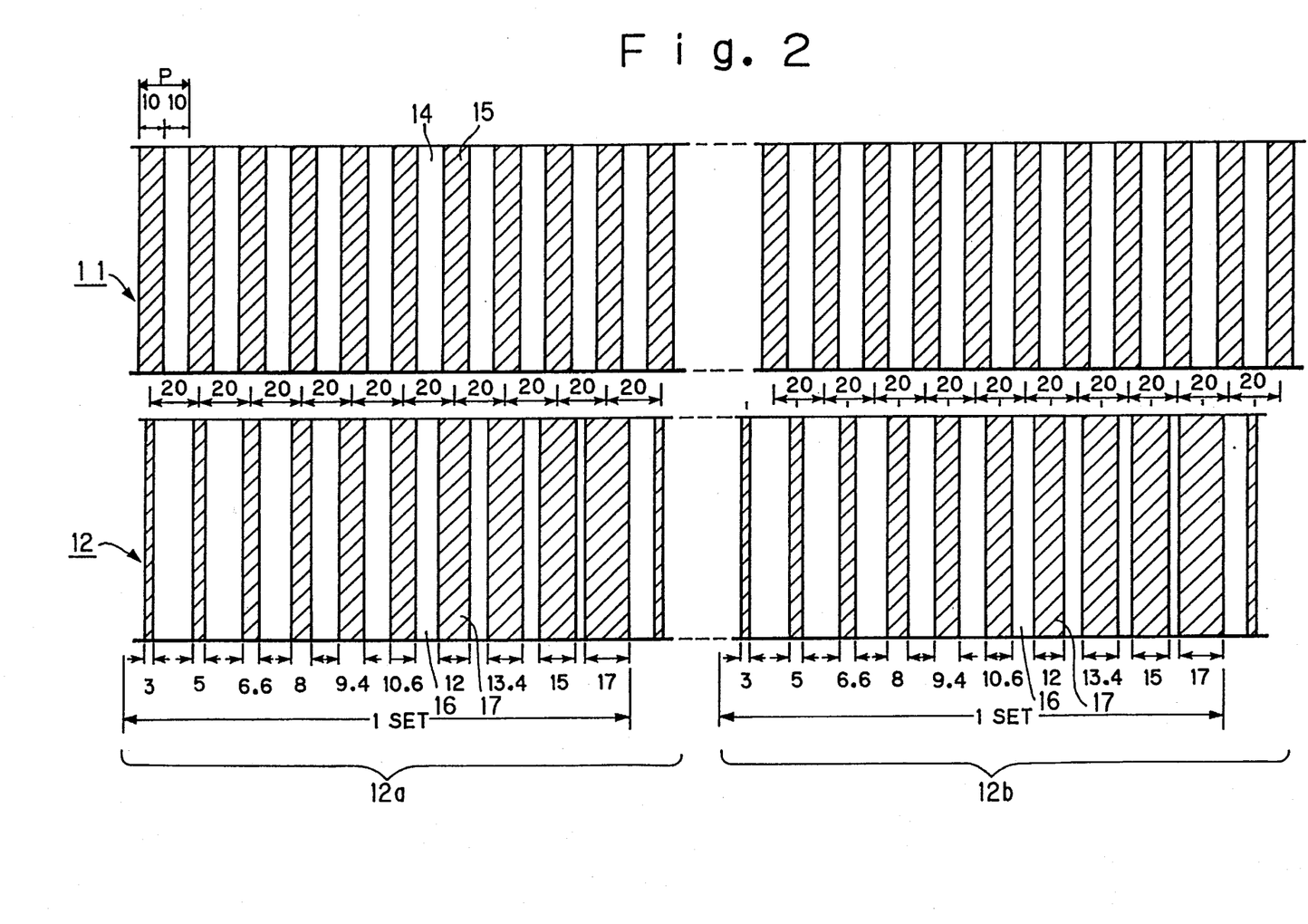
FIG. 2 shows grating patterns of a main scale and an index scale of the embodiment.

FIG. 2 shows the grating patterns on the main scale 11 and index scale 12. The main scale 11 has an uniform grating ( i.e., a rectangular grating ) which consist of rectangular transmitting portions 14 and rectangular non-transmitting portions 15 formed of Cr films, these portions 14, 15 being formed with a uniform width and alternately arranged by a uniform pitch P. In this embodiment, each of the transmitting portions 14 and the non-transmitting portions 15 has a width of 10 μm, and arranged at a pitch of 20 μm. In contrast, both the grating portions 12a and 12b on the index scale 12 are non-uniform gratings in which a plurality of rectangular transmitting portions 16 have different widths from each other, thereby a plurality of rectangular non-transmitting portions 17 also have different widths from each other.

The widths of the transmitting portions 16 and non-transmitting portions 17 are decided by a predetermined rule so as to work substantially as sine wave gratings. Such the rule will be described later.

Although each of the grating portions 12a, 12b is a non-uniform grating, the grating pitch thereof is the same as that of the main scale 11, i.e., 20 μm in the embodiment of FIG. 2. As shown in FIG. 2, each of the grating portions 12a, 12b comprises at least one set of M(=10) grating units, each unit consisting of a pair of transmitting portion 16 and non-transmitting portion 17. That is, each of the grating portions 12a and 12b consists of N ( where N is an integer of 1 or more) sets of grating group.

Each of the light detecting devices 13a and 13b has a light detecting surface to receive the output rays from the grating portions 12a and 12b, respectively. As a result, the detecting devices 13a and 13b are adapted to output A phase output signal and B phase output signal, respectively, which are phase shifted of 90 degrees each other.

Figure 3:
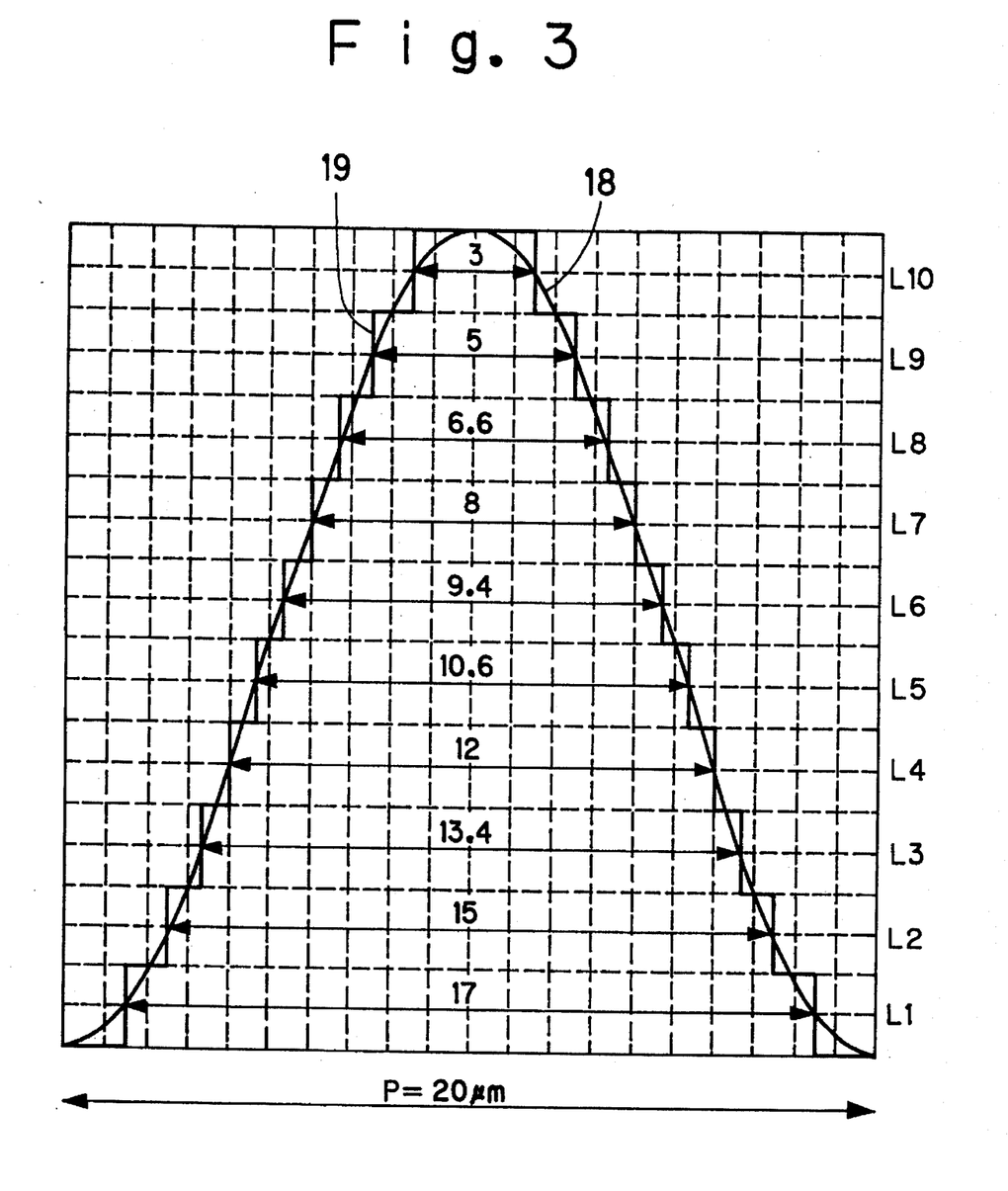
FIG. 3 is a figure for explaining a design process of the main scale of the embodiment.

The method for designing the above-mentioned non-uniform grating in the index scale 12 will be described in details bellow. As shown in FIG. 3, a sine waveform 18 having a wavelength of 20 μm as same as the scale grating pitch P is prepared. The sine waveform 18 is drawn in the range of the bottom-to-bottom. Then, the amplitude of the sine waveform 18 is divided at ten slice levels L1, L2, . . . , L10 with a constant step. By the division of sine waveform 18, a step waveform 19 approximating to the sine waveform 18 can be obtained as shown in FIG. 3. The widths of the sine waveform 18 at the slice levels are, as shown in FIG. 3, 3 μm, 5 μm, 6.6 μm, 8 μm, 9.4 μm, 10.6 μm, 2 μm, 13.4 μm, 15 μm and 17 μm. Then, the above-mentioned widths of the sine waveform 18 are, as shown in FIG. 2, assigned to the non-transmitting portions 17 of the grating portions 12a and 12b on the index scale 12.

Figure 4:
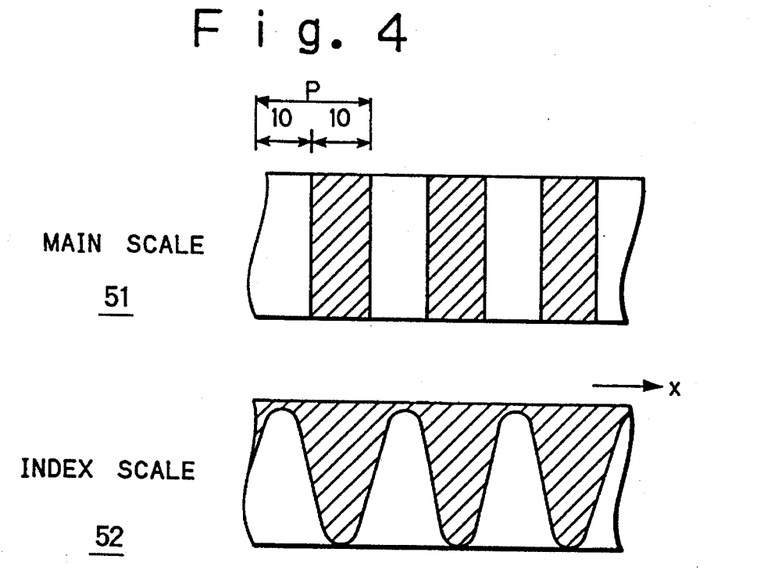
FIG. 4 shows a scale configuration equivalent to the embodiment.

As described above, the widths of the non-transmitting portions 17 on the non-uniform grating portions 12a and 12b are determined by each width of 10 slice levels of the sine waveform 18 adapting one pitch of the uniform grating 11 to have different values from each other. In other words, the index scale 12 distributively includes area information of the one cycle sine waveform 18 as the width information in 10 lattices of grating portions 12a and 12b. Therefore, the relation between the main scale 11 and the index scale 12 in FIG. 2 is substantially equivalent to the relation of the main scale 51 of the rectangular grating and the index scale 52 of the sine wave grating as shown in FIG. 4. The reason of that distortion is reduced by use of the above-mentioned sine wave grating is as follows:

Referring to the main scale 51 and the index scale 52 in FIG. 4, the main scale 51 is a rectangular grating. When the main scale 51 is irradiated by a collimated light, the amount of light It(x) transmitted through the main scale 51 is expressed by Fourier expansion as follows:

$$It(x) = \sum_{n=1}^{\infty} An \sin \frac{2(2n-1)\pi x}{P} \quad (1)$$

where, x is a position measured as shown in FIG. 4, P is the grating pitch, and An is n term amplitude. In equation (1), the direct component is omitted because the component is cancelled to be removed by a differential processing by use of another reverse phase output signal.

Figure 5A:
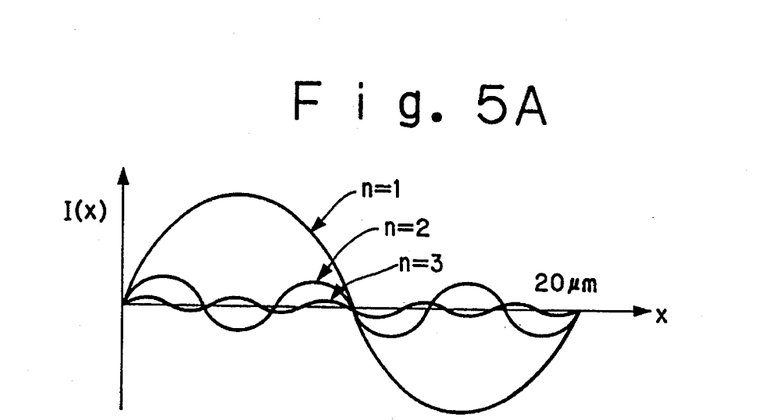
FIG. 5A shows a distribution of a transmitting light quantity passing through the rectangular wave grating.

FIG. 5A shows the relation of the amount of the transmitted light It(x) and the position x. In FIG. 5A, n=1 designates the fundamental wave component, n=2 and n=3 designate third and fifth harmonic components, respectively.

As shown in FIG. 4, when the main scale 51 is combined with the index scale 52 of sine wave grating having the same pitch as the main scale 51, the amount of transmitted light I(x) through the index scale 52 for M pitches (i.e., the amount of received light) is expressed as follows:

$$I(x) = M \int_0^P \sum_{n=1}^{\infty} An \sin \frac{2(2n-1)\pi(x+x1)}{P} \sin \frac{2\pi x1}{P} \, dx1 \quad (2)$$

Figure 5B:
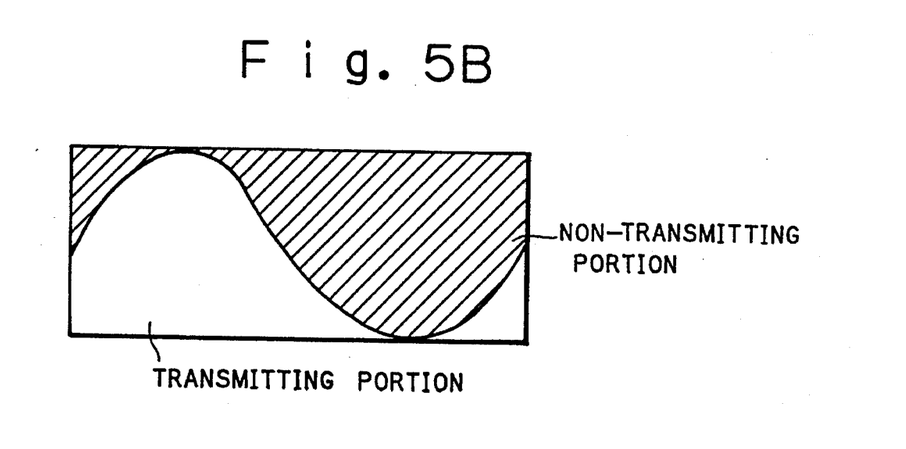
FIG. 5B shows a filter to take out a fundamental wave from the transmitting light wave of FIG. 5A.

The equation (2) means that the light distribution in FIG. 5A is filtered by the sine wave filter having transmitting portions and non-transmitting portions as shown in FIG. 5B. Therefore, in equation (2), only fundamental wave component is obtained. When n=1 is substituted in equation (2), the output amount of received light I(x) is expressed as follows:

$$I(x) = \frac{M A1 P}{2} \cos \frac{2\pi x}{P} \quad (3)$$

When n=2 or more, I(x)=0. Alternatively, the odd number harmonic components are removed by integration for 1 scale pitch.

When the index scale 52 in FIG. 4 is divided into M portions by horizontal slice lines at a uniform pitch, and then the M portions are arranged in series in x direction to construct 1 grating unit, the same result can be obtained. The grating portions 12a,12b in the index scale 12 in this embodiment are approximately equal to the above-described 1 grating unit. Alternatively, in this embodiment, since the index scale 12 includes the one cycle sine wave information within M pitches grating portion, the amount of the received light obtained in M pitches in accordance with the scale displacement is represented by a quasi-sine wave. The larger the divisional number M becomes, the more approximate to a sine wave the output becomes. This fact has been verified through a simulation test by the inventor.

Therefore, according to the embodiment, the odd number harmonic components are also removed from the output signal. However, it is preferable that M is selected in the range between 3 to 10. Because, if M is larger than 10, the width of 1 set of gratings in the index scale becomes too large to be uniformly irradiated.

Further, according to the embodiment, variation of the gap between the main scale and the index scale has not large influence on the output signal, as similar to an encoder having a sine wave grating.

As described above, according to the embodiment, by combination of the main scale formed of the uniform grating and the index scale formed of the non-uniform grating, it is able to obtain a quasi-sine wave output signal from which the harmonic distortion is removed. In the index scale in FIG. 2, if the relation between the transmitting portions 16 and the non-transmitting portions 17 is exchanged, the same result can be obtained.

In FIG. 2, the non-uniform grating in the index scale 12 has such a width distribution that the width information at the slice levels for the sine waveform in FIG. 3 are sequentially assigned as the widths of the non-transmitting portions 17 in order of width. However, the arrangement of the non-transmitting portions in 1 set of grating group having the sine wave information of 1 cyclic period is arbitrary. As apparent from FIG. 2, even if the non-transmitting portions 17 are arbitrarily distributed in the grating portions 12a and 12b, the same change of output signal is obtained about 1 set within 1 pitch displacement.

Figure 6:
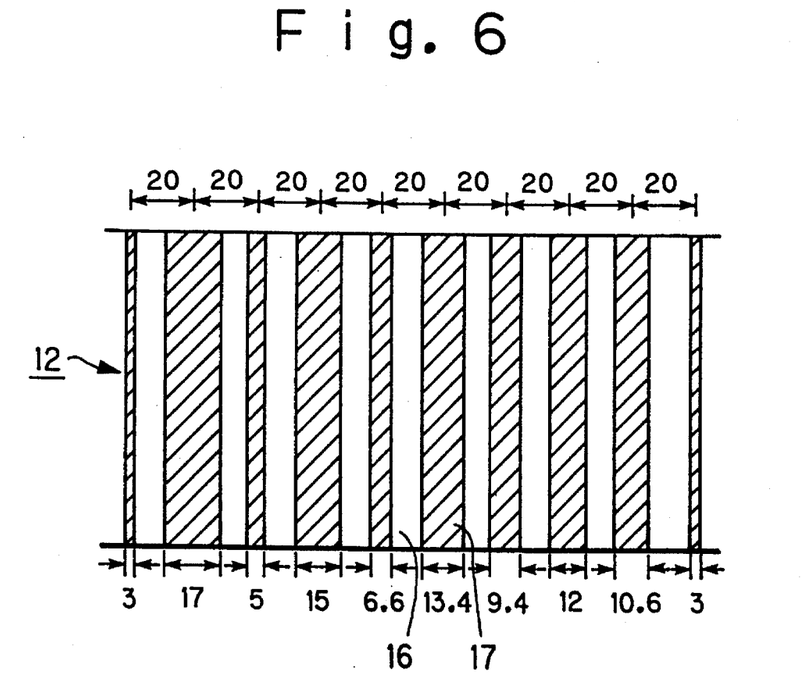
FIG. 6 shows a grating pattern of an index scale of another embodiment according to the invention.

FIG. 6 shows a layout example of the index scale 12 according to another embodiment which is preferable to that of FIG. 2. In this embodiment, the non-transmitting portions 17 are dispersed according to a rule such that the variation of the widths of the transmitting portions 16 are minimized, as follows: The narrowest non-transmitting portion (=3 μm) and the widest nontransmitting portion (=17 μm) are disposed to neighbor each other, the secondary narrower non-transmitting portion (=5 μm) and the secondary wider non-transmitting portion (=15 μm) are disposed to neighbor each other, and the like. According to this embodiment, the distribution of the transmitting portions 16 in 1 set of grating groups can be more uniform than that in FIG. 2. As a result, the spatial distribution of the amount of light in 1 set can be more uniform. Further, because of that it is not necessary to use narrower slits than a predetermined value, it is advantageous for manufacturing optical encoders.

Figure 7:
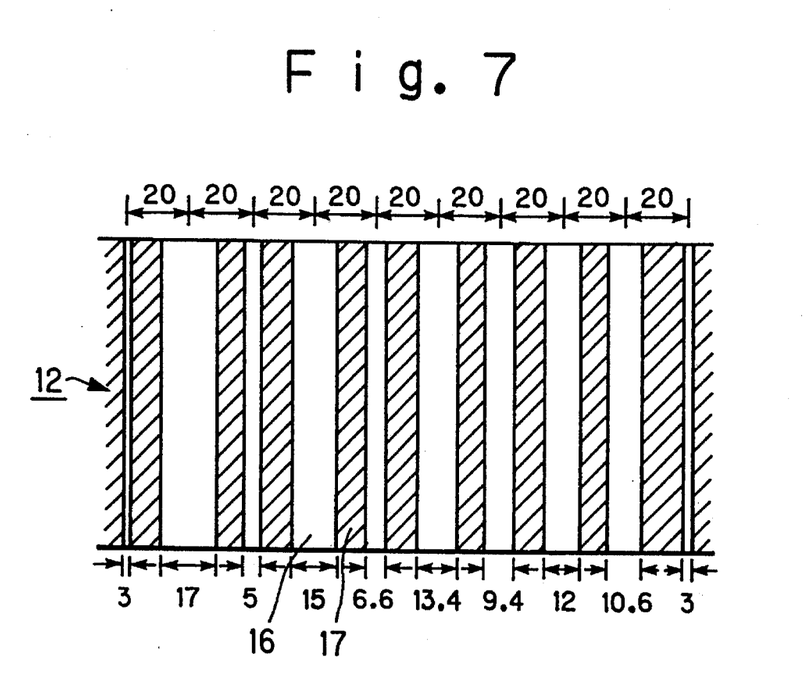
FIG. 7 shows a grating pattern of an index scale of another embodiment of the invention.

FIG. 7 shows another example of the index scale 12. In this embodiment, in contrast to the example of FIG. 6, the transmitting portions 16 are dispersed according to the same rule as the example of FIG. 6. Alternatively, The narrowest transmitting portion (=3 μm) and the widest transmitting portion (=17 μm) are disposed to neighbor each other, the secondary narrower transmitting portion (=5 μm) and the secondary wider transmitting portion (=15 μm) are disposed to neighbor each other, and the like. According to this distributional arrangement, the widths of the non-transmitting portions 17 in 1 set of grating groups can be more uniform.

Figure 8:
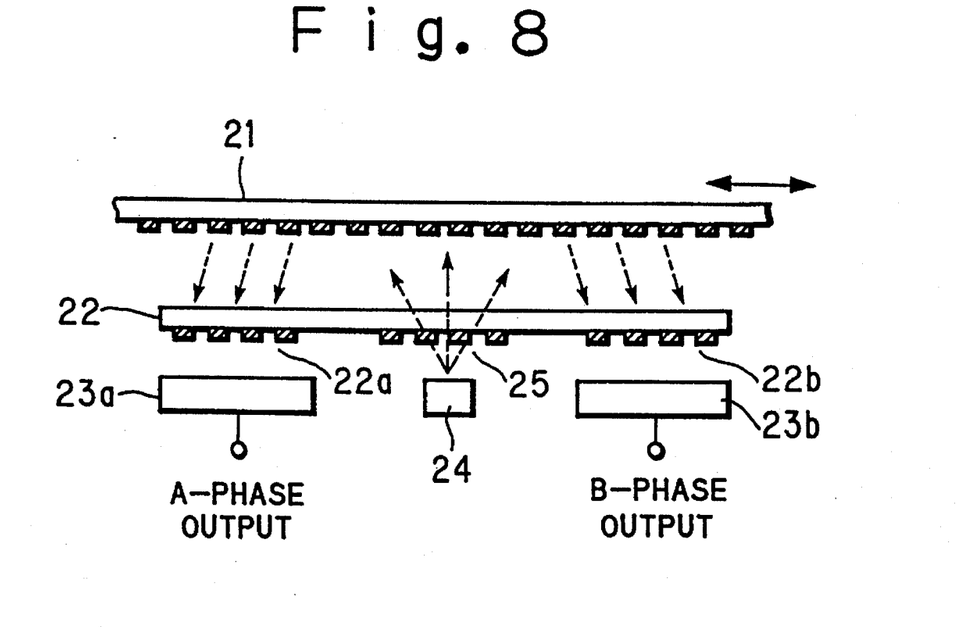
FIG. 8 show a reflection type linear encoder of another embodiment of the invention.

FIG. 8 shows a reflective type linear encoder according to another embodiment. A main scale 21 is a uniform grating on which transmitting portions and non-transmitting portions (i.e., reflecting portions) are arranged with width ratio of 1:1 similar to the above-described embodiment. An index scale 22 has grating portions 22a and 22b which are non-uniform gratings, each of the portions 22a and 22b corresponding to the grating portions 12a and 12b in the above-described embodiment. It is provided on the index scale 22 that a diffraction grating portion 25 for obtaining a collimated ray from output of a diffusion light source 24 (for example, LED). The grating portion 25 is a uniform grating, and used as a secondary light source in accordance with a well-known 3-grating theory.

According to this embodiment, it is able to obtain a less distorted sine wave output signal similar to the above-described embodiments.

Figure 9:
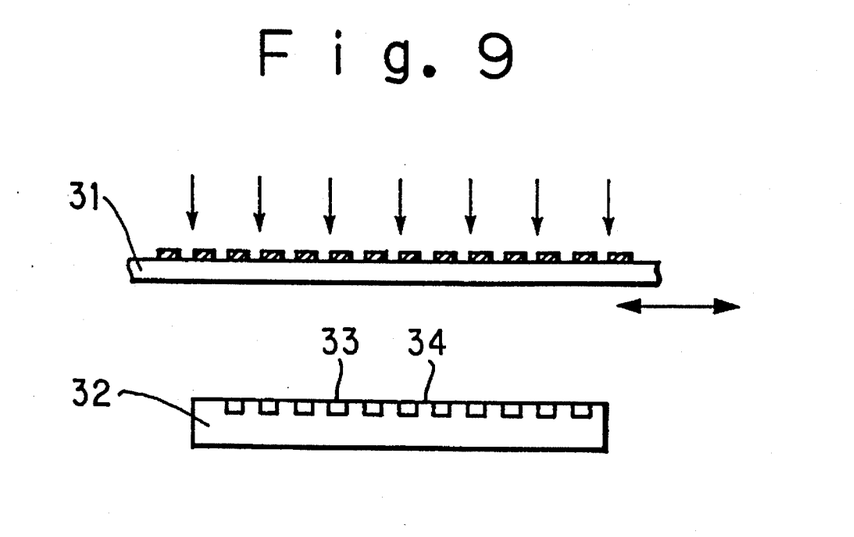
FIG. 9 shows a transmitting type linear encoder of another embodiment of the invention.
Figure 10:
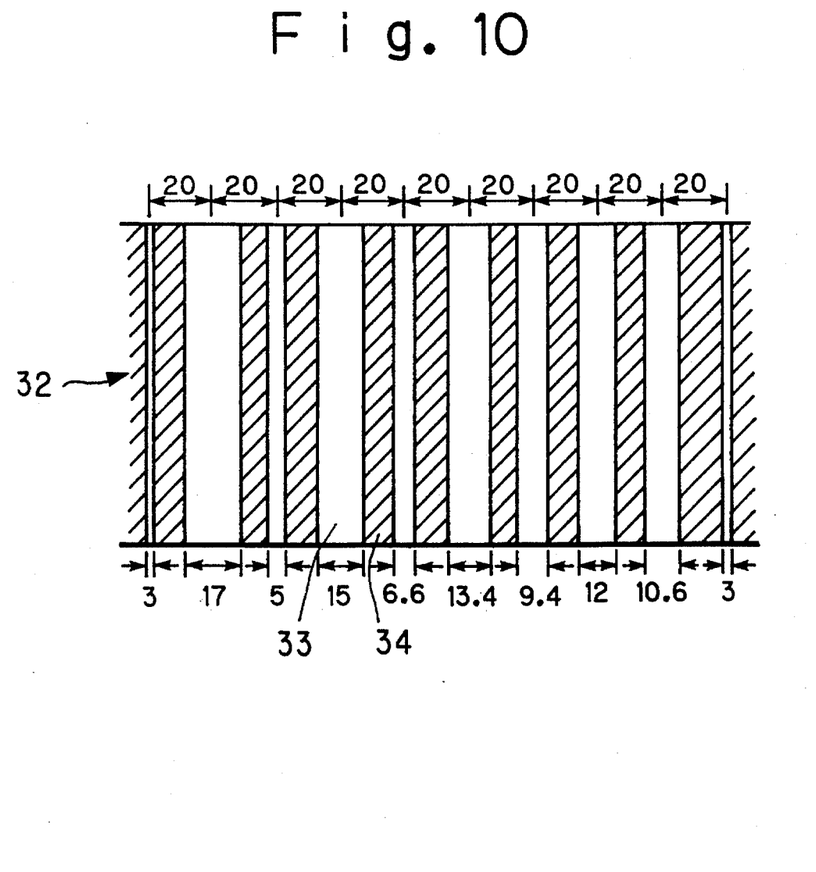
FIG. 10 shows a detecting surface arrangement of a photo detector array of FIG. 9.

FIG. 9 shows a linear encoder which has no index scale according to another embodiment. A main scale 31 is a uniform grating in which transmitting portions and non-transmitting portions are alternately arranged with width ratio of 1:1 similar to the above-described embodiments. A light detecting device array 32 are disposed so as to oppose the main scale 31 and receive a transmitted light thereof. The light detecting device array 32 serves as an index scale. Alternatively, the light detecting surfaces are arranged similar to the transmitting portions of the above-described index scale to be used as an non-uniform grating. FIG. 10 shows a pattern example of the detecting device array 32. Light detecting portions 33 and wiring area 34 are arranged as same as the transmitting portion 16 and the non-transmitting portions 17 in FIG. 7, respectively.

According to this embodiment, it is able to obtain a less distorted sine wave output signal similar to the above-described embodiments.

In the embodiment of FIG. 9, it is able to use the grating arrange of FIG. 6 for the light receiving portion arrangement. However, the array of FIG. 10 equivalent to that of FIG. 7 is preferable, because the wiring area 34 can be secured more broader rather than the array of FIG. 6.

Figure 11:
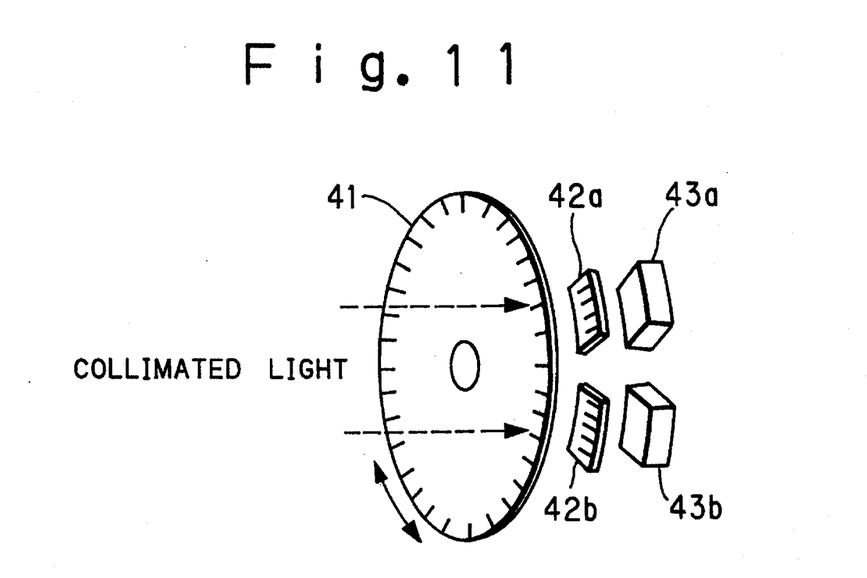
FIG. 11 shows rotary encoder of another embodiment of the invention.

FIG. 11 shows a rotary encoder according to another embodiment. This encoder comprises, as shown in FIG. 11, a rotor 41 which serves as a rotating main scale, stators 42 (42a, 42b) which serve as fixed index scales, and light detecting devices 43a, 43b. Similar to the above-described embodiments, the rotor 41 and stators 42 consist of a uniform grating and non-uniform grating, respectively. According to the embodiment, it is able to obtain a less distorted sine wave output signal.

In the above-mentioned embodiments, although uniform gratings serve as main scales, and non-uniform gratings serve as index scales, it is able to exchange the use of the uniform gratings and the non-uniform gratings. Further, in the above-mentioned embodiments, the sine wave information is sliced and divided to 10 parts to be dispersed to 10 lattices on a scale. However, it can be selected an arbitrary integer 2 or greater for the number of slice levels.

Although a pair of index scales is used in the above-described embodiments, it is able to use four index scales which output four displacement signals having phases of 0°, 90°, 180° and 270°, respectively.

Further, in the present invention, one cycle sine waveform can be divided into a plurality of area portions by vertical slice lines.

According to the present invention, one of the scales is an uniform grating, and the other is a non-uniform grating, the transmitting portions and the non-transmitting portions of the non-uniform grating being arranged at the same pitch of the uniform grating, and each width of the transmitting portions and the non-transmitting portions having the same as each width at M sliced levels of the sine waveform which has a wavelength equal to one pitch of the uniform grating. Therefore, it is able to output a less distorted displacement signal, thereby the precise position measurement can be done by this displacement signal. Further, according to the present invention, it is not necessary to form of a sine wave pattern for manufacturing of scales, thereby it is easy to make scales having a precise grating pattern. As a result, the position measurement precision of the optical encoder can be improved.

What is claimed is:

1. An optical encoder having first and second scales arranged in parallel with each other to be relatively movable, optical gratings being formed thereon at a predetermined pitch respectively, a light source for irradiating collimated light to the first scale, and light detecting means for detecting transmitted light through the second scale, the transmitted light being modulated by movement between the first and second scales, wherein one of the first and second scales has a uniform grating which is formed of a plurality of rectangular transmitting portions and a plurality of rectangular non-transmitting portions alternately arranged at a predetermined pitch, each of the rectangular transmitting portions having a uniform width, and the other of the first and second scales has a non-uniform grating consisting of at least one set of M (where M is an integer of 2 or more) pairs, each pair having a rectangular transmitting portion and a rectangular non-transmitting portion, the pairs being arranged at the same pitch as the uniform grating, said rectangular transmitting portions on said non-uniform grating having different widths from each other within said one set of M pairs so as to include information of a one cycle sine waveform whose wavelength is equal to one pitch of said uniform grating.

2. The optical encoder according to claim 1, wherein, said one cycle sine waveform is represented in a range of bottom-to-bottom, and each width of said rectangular transmitting portions is set to be equal to each width of sliced portions of said one cycle sine waveform sliced by M different slice levels.

3. The optical encoder according to claim 1, wherein,

M is an integer selected in the range between 3 to 10.

4. The optical encoder according to claim 1, wherein, said first scale is a main scale, and said second scale is an index scale on which at least two non-uniform gratings are arranged so as to output at least two sine wave displacement signals whose phases are mutually shifted of 90 degrees.

5. The optical encoder according to claim 1, wherein, said first scale is a main scale, and said second scale is a light detecting device array which serves as an index scale.

6. The optical encoder according to claim 1, wherein, said non-transmitting portions in said non-uniform grating are dispersed within said one set of M pairs so as to minimize the variation of the widths of said transmitting portions in said non-uniform grating.

7. The optical encoder according to claim 1, wherein, said transmitting portions in said non-uniform grating are dispersed within said one set of M pairs so as to minimize the variation of the widths of said non-transmitting portions in said non-uniform grating.

8. The optical encoder according to claim 1, wherein, said first and second scale are constructed to be a linear scale.

9. The optical encoder according to claim 1, wherein, said first and second scale are constructed to be rotary encoder.

\* \* \* \* \*